July 4, 1939.     W. EATON ET AL     2,165,036
HOT BLAST VALVE
Filed Dec. 30, 1936     2 Sheets-Sheet 1

INVENTORS
Wyman Eaton
John C. Hayes

July 4, 1939.  W. EATON ET AL  2,165,036
HOT BLAST VALVE
Filed Dec. 30, 1936  2 Sheets-Sheet 2
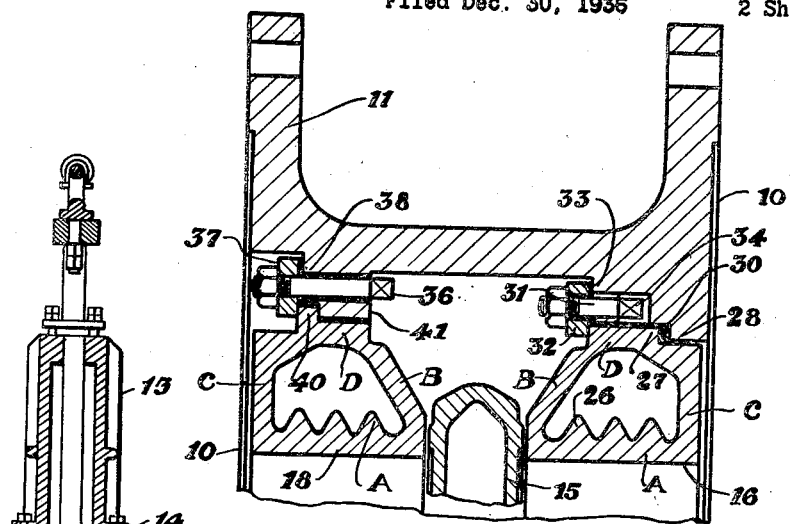
Fig. 3
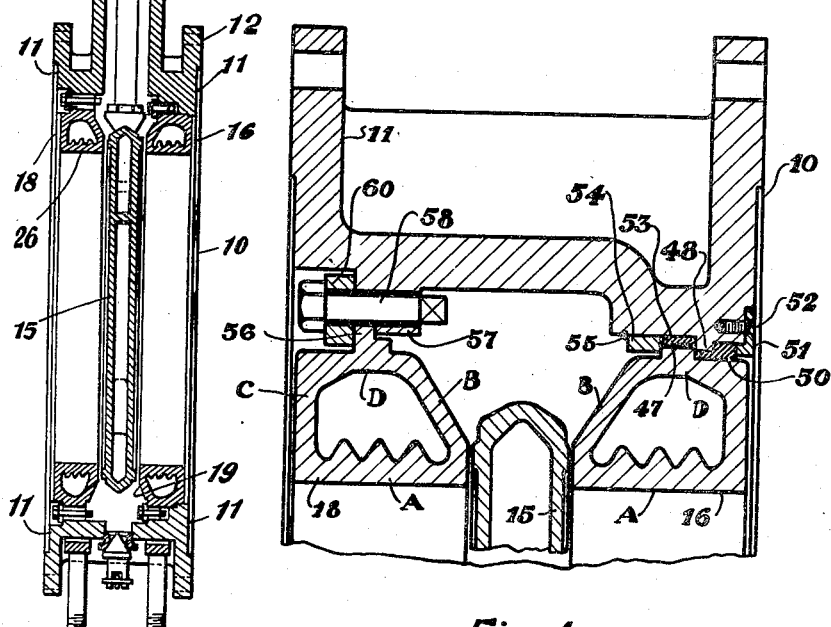
Fig. 2
Fig. 4
INVENTORS
Wyman Eaton
John C. Hayes
BY
ATTORNEY.

Patented July 4, 1939

2,165,036

UNITED STATES PATENT OFFICE 2,165,036

HOT BLAST VALVE

Wyman Eaton and John C. Hayes, Chicago, Ill., assignors to Freyn Engineering Company, Chicago, Ill., a corporation of Maine Application December 30, 1936, Serial No. 118,297

12 Claims. (Cl. 251—168)

The invention relates to hot blast valves of the gate type and particularly to valves designed for use in gas and air conduits especially the water-cooled type which are used extensively in hot blast mains of metallurgical furnaces.

Valves of the type described essentially consist of a housing having an annular seat member located on each side of a valve disc adapted to be moved upwardly out of engagement with the seat members for opening the valve. As heretofore constructed the housing was horizontally split in order that the seat members might be inserted and the two halves of the housing then clamped upon the members and bolted together. While this was a reasonably convenient arrangement with reference to assembly of the valve it has proved quite troublesome due to the fact that the housing of the valve soon became quite hot as a result of the heat passing through the slot between the seat members. This heating of the valve housing caused a certain amount of expansion and contraction which eventually led to leakage of the horizontal joint between the two halves of the housing.

In order to rectify this difficulty a one-piece housing is desirable. With such a housing the seat members can no longer be put in position as heretofore and it thus becomes necessary to introduce the members from one end or from both ends of the housing. Although there is a desirable advantage in introducing both of the seat members from one end of the housing, the one piece construction of the housing presents problems in initially locating the seat members properly in the housing and in subsequently retaining them in position during operation. Also it is necessary to prevent leakage between at least one of the members and the housing which requires the location of packing at the joint. The situation is accentuated by the pressure differences between different parts of the valve and further by the heavy pressure caused by the gate seating against a seat member and thereby tending to move the member.

In the embodiment of the invention shown in the drawings the housing is an integral one piece casting with provision being made for introducing both seat members from one end of the casting and for securely maintaining each member in place within the housing. However, the securing means is not depended upon to hold against pressure and therefore they can be readily released in the event it becomes necessary to replace a worn seat member.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts—

Figure 2 is a transverse sectional view taken at right angles to that of Figure 1;

Figure 3 is a fragmentary sectional view showing means for positioning and retaining the valve seats within the housing; and Figure 4 is a fragmentary sectional view showing modified means for positioning and retaining the valve seats within the housing.

Figure 1:
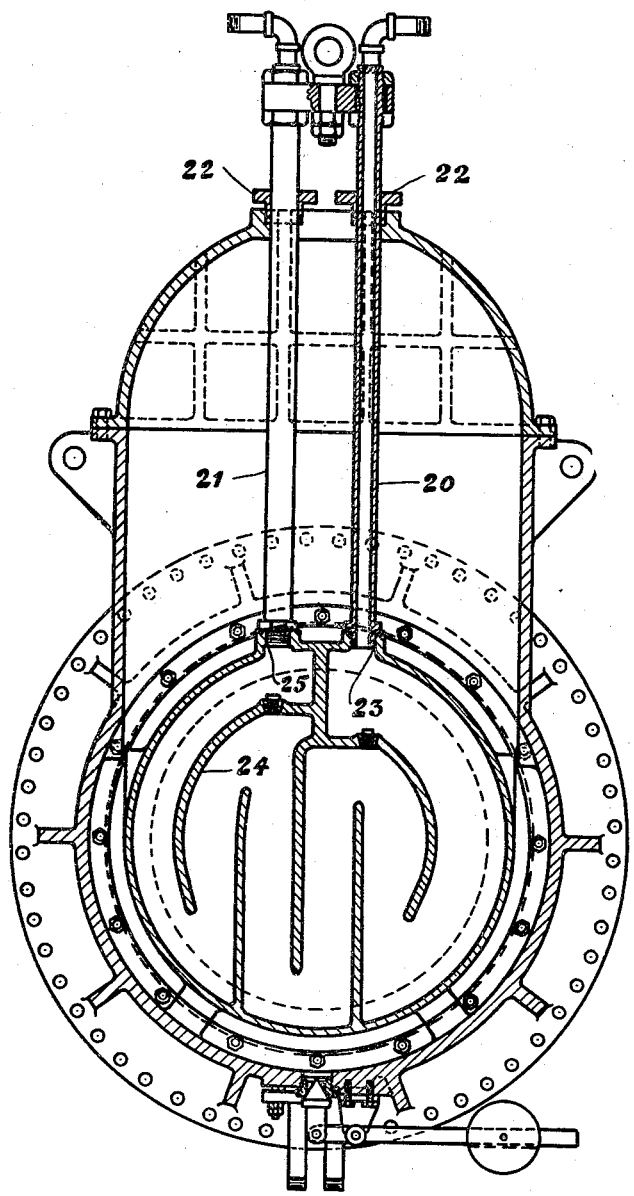
Figure 1 is a vertical sectional view taken through a gate valve constructed in accordance with the present invention.

The valve body consists of a housing formed by the integral one-piece casting identified by numeral 10 provided with vertical flanges 11 for securing the valve body to the hot blast main, said securing means preferably comprising bolts adapted to pass through openings 12 in the vertical flanges of the housing and main respectively. A top portion 13 is also secured to the housing in any well known manner as by bolts 14. A circular hollow valve or disc 15 is located within the valve body and positioned between annular valve seats 16 and 18 which have their inwardly directed surfaces tapered as at 19 to provide a seat for valve 15. The valve stem for supporting the valve disc 15 comprises two pipes 20 and 21 extending through the top of the valve body 13 and being guided by glands 22. By employing pipes as valve stems provision is made for an inlet and outlet through which cooling water is delivered and discharged from the interior of the disc valve. Pipe 20 connects with the valve disc at 23 and delivers cooling water which flows through passages formed by the reinforcing ribs 24. The ribs are disposed so as to form passages of progressively decreasing cross section and which reach a minimum at 25 where said valve disc joins with 21 which functions as an outlet for the cooling fluid.

Valves of the above type rely for their closing on the pressure of the gas against the valve disc. For purposes of illustration the right hand side of the valve disc, as shown in Figure 2, will be considered as joined by the gas main or conduit to the hot blast stove. This side of the valve disc will therefore be subjected to a relatively low pressure compared to the pressure existing on the left hand side of the valve disc. The result of the pressure difference is to force the valve disc 15 toward the valve seat 16 which is therefore constructed and secured in place within the housing 10 in a manner to withstand the pressure of the valve against the same and to prevent leakage past the seat member.

In accordance with the invention the one-piece casting forming the housing of the present valve is machined to provide interior surfaces which form circular openings of slightly different diameter. The largest opening is at the left end of the housing, Figure 2, and the other opening, somewhat smaller in diameter, is located at the right hand side of the housing. The valve seats are inserted within the housing from the left hand side and thus the right hand seat will pass completely through the bore of the housing at the point where the left hand valve seat is located.

Referring more particularly to Figure 3, the valve seat 16 is shown as having an interior wall A which is subjected to the highest temperature and therefore said wall on its inner surface is provided with inwardly directed ribs or projections 26 which extend throughout the periphery of the water surface of this wall. These projections increase the water surface of said wall and aid in the dissipation of heat therefrom. Walls B and C form connecting walls joining with the rear wall D. Said latter wall is provided with a projection 27 forming a shoulder adapted to contact a similar shoulder 28 provided by the housing 10. For purposes which will be later explained a gasket 30 is confined between said shoulders. For retaining the valve seat 16 within its housing to further compress the gasket 30 T bolts 31 are provided which retain a ring 32 against shoulder 33 of the housing and against the projection 27 of said valve seat. The T heads of the bolts 31 fit within a circular groove 34 machined in the housing and the shank of each bolt passes through a cored slot as it is impossible to drill a hole through this wall of the housing at this point. A plurality of T bolts 31 are spaced around the bore of the housing, thereby releasably maintaining the ring 32 in firm engagement with said housing and with the valve seat. The retaining ring 32 need not be continuous but may be made in sectors of any length desired. As the gasket 30 is maintained under pressure, being confined between the shoulder 27 of the valve seat 16 and shoulder 28 of the housing, it effectively prevents leakage of gas past the valve seat and is further retained in a manner preventing distortion of the gasket.

As previously explained the valve disc 15 will be retained against the valve seat 16 by the relatively high pressure on the left hand side of said valve disc. It will therefore be appreciated that the retaining bolts and retaining ring are not depended upon to hold the valve seat against pressure. Said means merely hold the valve seat in place within the housing. As the pressure against the valve disc is always in one direction and further, in view of the fact that there is no pressure difference between the two sides of the left hand valve seat 18, it is not necessary to provide a gasket in connection with this seat member, although the retaining means for this seat is substantially similar to that above described. T bolts 36 are used for securely holding the retaining ring 37 in contact with shoulder 38 of the housing and projection 40 of the valve seat. Said projection is adapted to fit within an angular recess providing the shoulder 41 of the housing and accordingly said projection and shoulder are maintained in firm engagement. In this instance it will be noted that the T bolts pass through holes which may be drilled in this wall of the housing.

The present construction of valve housing and valve seat together with retaining means therefor is relatively simple as the external surfaces of the valve seats and the internal surfaces of the housing may be readily machined, thus insuring a close and accurate fit of the parts. Also assembly of the structure is relatively easy as the interior parts of the valve may be placed in position with the valve horizontal and which will not require turning the valve over. Although pressure differences will exist with respect to the right hand seat member 16 the retaining means are not subjected to this pressure. However, the retaining means are utilized to force the seat member into contact with the annular gasket 30 which is located so that it can not be squeezed out of its channel or otherwise distorted and therefore pressure against the gasket will aid in preventing leakage of gas past said seat member.

The modified construction shown in Figure 4 differs from the structure of Figure 3 in that the valve seat 16 is held in place by a retaining ring that is welded to the interior wall of the housing in such manner that said ring is releasable and can be removed in the event it is necessary to replace a worn out valve seat. Each of the valve seats 16 and 18 consists of an interior wall A connecting by walls B and C with a rear wall D. Referring to valve seat 16 the wall D is provided with a projection 47 forming a shoulder adapted to contact a similar shoulder 48 provided by the housing. To the exterior of shoulder 48 the housing wall is recessed to provide space for packing 50 and which is held within the recess by member 51 secured to the housing 10 by screws 52. A gasket or packing 53 may also be placed between the housing wall and projection 47 to further insure against leakage of gas past the valve seat. The valve seat 16 is held in contact with shoulder 48 by the retaining ring 54 which need not be continuous but may be made in sectors of any length desired. The ring is welded to the housing at 55. The weld need not be continuous.

As previously explained with respect to Figure 3 the valve disc 15 will be retained against valve seat 16 by the relatively high pressure on the left hand side of said valve discs. The retaining ring 54, welded to the housing, holds valve seat 16 in place and the pressure against the same will force said seat into firm contact with shoulder 48 of the housing. Releasable securing means are employed for the valve seat 18 which, as shown in Figure 4, is provided with a projection 56 adapted to engage shoulder 57 of the housing. T bolts 58 passing through holes drilled in the wall of the housing secure the retaining ring 60 which in turn holds the valve seat 18 in place. As a further modification it is possible to omit the bolts altogether and to use welding for securing both rings to the housing. The retaining rings whether continuous or in sections are preferably tack-welded to the housing, it being appreciated that neither the ring nor the weld need be continuous as the elements merely hold the seats in position. It is therefore a simple matter to release the retaining rings by cutting the tack-welds with a chisel.

The invention is not to be limited to or by details of construction of the particular embodiment thereof illustrated in the drawings, as various other forms of the device will of course be apparent to those skilled in the art without departing from the spirit of the invention or the scope of the claims.

What is claimed is:

1. In a gate valve, the combination with a casing including an integral housing, of a pair of annular seat members vertically positioned within the housing and held in spaced relation by spaced shoulders formed in the interior wall of the housing, a disc valve located between the seat members and adapted to seat against one of said members when in closed position, said seat members having substantially the same internal diameter but having different overall diameters to permit insertion with the housing from the same side thereof, and means retaining the seat members in place within the housing.

2. In a gate valve, the combination with a casing including an integral housing, of a pair of annular seat members vertically positioned within the housing and held in spaced relation by spaced shoulders formed in the interior wall of the housing, a disc valve located between the seat members and adapted to seat against one of said members when in closed position, said seat members having substantially the same internal diameter but having different overall diameters to permit insertion within the housing from the same side thereof, and a retaining ring holding each seat member against its respective shoulder within the housing.

3. In a gate valve, in combination, a valve casing including an annular housing, the interior wall of said housing having spaced shoulders and the diameter of the opening at one of said shoulders being different than the diameter of the opening at the other shoulder, a pair of annular seat members each having a projection on its periphery for engaging one of said spaced shoulders, said seat members having substantially the same internal diameter but the over-all diameter of each seat member conforming to the size of its respective opening, whereby said seat members can be inserted within the housing from the same side thereof.

4. In a gate valve, in combination, a valve casing including a one-piece casting forming an annular housing, the interior wall of said housing having spaced shoulders, the diameter of the opening at the shoulders decreasing from one side of said housing in a direction toward the other, a pair of annular seat members each having a projection on its periphery for engaging one of said spaced shoulders, said seat members having substantially the same internal diameter but the over-all diameter of each seat member conforming to the size of its respective opening, whereby said seat members can be inserted within the housing from the same side thereof, and means releasably retaining each seat member within the housing and against its respective shoulder.

5. In a gate valve, in combination, a valve casing including an annular housing, the interior wall of said housing having spaced shoulders, the diameter of the opening at one of said shoulders being different than the diameter of the opening at the other shoulder, a pair of annular seat members each having a projection on its periphery for engaging one of said spaced shoulders, a disc valve located between the seat members and adapted to seat against one of said members when in closed position, said seat members having substantially the same internal diameter but the over-all diameter of each seat member conforming to the size of its respective opening, whereby said seat members can be inserted within the housing on the same side thereof, a gasket located between the shoulder and the projection on that seat member having the smallest over-all diameter, and means releasably securing said seat member to the housing, said means forcing said seat member into contact with said gasket.

6. In a gate valve, in combination, a valve casing including a one-piece casting forming an annular housing, the interior wall of said housing having spaced shoulders, the diameter of the opening at one of said shoulders being different than the diameter of the opening at the other shoulder, a pair of annular seat members each having a projection on its periphery for engaging one of said spaced shoulders, a disc valve located between the seat members and adapted to seat against one of said members when in closed position, said seat members having substantially the same internal diameter but the over-all diameter of each seat member conforming to the size of its respective opening, whereby said seat members can be inserted within the housing from the same side thereof, a gasket located between the shoulder and the projection on that seat member having the smallest over-all diameter, and means comprising T bolts and a retaining ring for releasably securing said seat member within the housing, said means applying pressure against the seat member to force the same into contact with said gasket.

7. In a gate valve, in combination, a valve casing, an integral housing having an interior wall provided with spaced shoulders, a pair of annular seat members each having a projection on its periphery for engaging one of said spaced shoulders, a disc valve located between the seat members and adapted to seat against one of said members when in closed position, said seat members having substantially the same internal diameter but the over-all diameter of the seat members being different to permit insertion of the members within the housing on the same side thereof, and a retaining ring holding each seat member against its respective shoulder, at least one of said retaining rings being welded to the wall of the housing.

8. In a gate valve, in combination, a valve casing, an integral housing having an interior wall provided with spaced shoulders, a pair of annular seat members each having a projection on its periphery for engaging one of said spaced shoulders, a disc valve located between the seat members and adapted to seat against one of said members when in closed position, said seat members having substantially the same internal diameter but the over-all diameter of the seat members being different to permit insertion of the members within the housing on the same side thereof, a retaining ring holding each seat member against its respective shoulder, one of said retaining rings being welded to the housing, and packing positioned between the housing wall and that seat member having the smaller over-all diameter and being located to the outside of the projection on said seat member.

9. In a gate valve, in combination, a valve casing including an annular housing, the interior wall of said housing having spaced shoulders, the diameter of the opening at one of said shoulders being different than the diameter of the opening at the other shoulder, a pair of annular seat members each having a projection on its periphery for engaging one of said spaced shoulders, a disc valve located between the seat members and adapted to seat against one of said members when in closed position, said seat members having substantially the same internal diameter but the over-all diameter of each seat member conforming to the size of its respective opening, whereby said seat members can be inserted within the housing on the same side thereof, and a retaining ring holding each seat member against its respective shoulder, the retaining ring holding the seat member having the smaller diameter being welded to the housing.

10. In a gate valve, in combination, a valve casing including an annular housing having spaced shoulders formed in the interior wall thereof, a pair of annular seat members each having a projection on its periphery for engaging one of said spaced shoulders, whereby said seat members are disposed in spaced relation within the housing, said seat members having substantially the same internal diameter but having different over-all diameters to permit insertion within the housing on the same side thereof, and a valve disc for location between the members to close the gate valve, said valve disc when in position closing the gate valve applying pressure upon one seat member forcing the projection of said seat member against its respective shoulder.

11. In a gate valve, in combination, a valve casing including an annular housing, the interior wall of said housing having spaced shoulders formed therein, a pair of annular seat members each having a projection on its periphery for engaging one of said spaced shoulders, whereby said seat members are disposed in spaced relation within the housing, said seat members having substantially the same internal diameter but having different over-all diameters to permit insertion within the housing on the same side thereof, a valve disc for location between the members to close the gate valve, said valve disc when in position closing the gate valve applying pressure upon one seat member forcing the projection of said member toward its respective shoulder, and a gasket located between |said shoulder and the projection of the seat member.

12. In a gate valve, in combination, a valve casing including an annular housing, the interior wall of said housing having spaced shoulders formed therein, a pair of annular seat members each having a projection on its periphery for engaging one of said spaced shoulders, whereby said seat members are disposed in spaced relation within the housing, said seat members having substantially the same internal diameter but having different over-all diameters to permit insertion within the housing on the same side thereof, a valve disc for location between the members to close the gate valve, said valve disc when in position closing the gate valve applying pressure upon one seat member forcing the projection of said member against its respective shoulder, and a retaining ring positioned to the other side of said projection and being welded to the interior wall of the housing.

WYMAN EATON.
JOHN C. HAYES.

CERTIFICATE OF CORRECTION.

Patent No. 2,165,036. July 4, 1939.

WYMAN EATON, ET AL.

It is hereby certified that error appears in the printed specification of the above numbered patent requiring correction as follows: Page 3, first column, line 17, claim 1, for "with" read within; and that the said Letters Patent should be read with this correction therein that the same may conform to the record of the case in the Patent Office.

Signed and sealed this 12th day of September, A. D. 1939.

(Seal)
Henry Van Arsdale,
Acting Commissioner of Patents.